(12) United States Patent
Issa et al.

(10) Patent No.: US 9,424,882 B2
(45) Date of Patent: *Aug. 23, 2016

(54) SYSTEM AND METHOD FOR SEMANTIC TRICK PLAY

(71) Applicant: Porto Technology, LLC, Wilmington, DE (US)

(72) Inventors: Alfredo C. Issa, Apex, NC (US); Kunal Kandekar, Jersey City, NJ (US); Richard J. Walsh, Raleigh, NC (US)

(73) Assignee: Porto Technology, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,898

(22) Filed: Nov. 9, 2015

(65) Prior Publication Data

US 2016/0064032 A1    Mar. 3, 2016

Related U.S. Application Data

(63) Continuation of application No. 12/457,428, filed on Jun. 10, 2009, now Pat. No. 9,183,881.

(60) Provisional application No. 61/149,220, filed on Feb. 2, 2009.

(51) Int. Cl.
*H04N 21/214* (2011.01)
*G11B 27/00* (2006.01)
*H04N 5/783* (2006.01)
*H04N 9/79* (2006.01)
*H04N 21/435* (2011.01)
*H04N 21/472* (2011.01)
*H04N 21/84* (2011.01)

(52) U.S. Cl.
CPC .............. *G11B 27/005* (2013.01); *H04N 5/783* (2013.01); *H04N 9/79* (2013.01); *H04N 21/214* (2013.01); *H04N 21/435* (2013.01); *H04N 21/47217* (2013.01); *H04N 21/84* (2013.01)

(58) Field of Classification Search
None
See application file for complete search history.

(56) References Cited

U.S. PATENT DOCUMENTS

| 5,640,193 | A | * | 6/1997 | Wellner | H04N 7/15 348/E7.071 |
|---|---|---|---|---|---|
| 5,905,865 | A | | 5/1999 | Palmer et al. | |
| 5,940,831 | A | | 8/1999 | Takano | |
| 6,530,084 | B1 | | 3/2003 | Del Sesto et al. | |
| 6,745,368 | B1 | | 6/2004 | Boucher et al. | |

(Continued)

OTHER PUBLICATIONS

Francisco-Revilla, Luis, "A Picture of Hypervideo Today," at <http://www.csdl.tamu.edu/~l0f0954/academic/cpsc610/p-1.htm>, 1998, printed Sep. 6, 2011, 15 pages.

(Continued)

*Primary Examiner* — Eileen Adams (57) ABSTRACT

A semantic based trick play method and system in a media player is provided in which a semantic trick play command is received from a user while the user is experiencing a current content of a media item. Metadata is detected with respect to a current playback position of the media item, and at least one further playback position is determined in the current content of the media item or a related content in another media item. The further playback position is semantically related to the metadata of the current playback position. Playback is then moved to the at least one further playback position, so that the user experiences a media content of the at least one further playback position.

18 Claims, 4 Drawing Sheets

(56) References Cited

U.S. PATENT DOCUMENTS

| | | | |
|---|---|---|---|
| 6,907,570 | B2 | 6/2005 | Amir et al. |
| 7,036,083 | B1 | 4/2006 | Zenith |
| 7,149,411 | B2 | 12/2006 | Jun et al. |
| 7,319,806 | B1 | 1/2008 | Willner et al. |
| 7,356,830 | B1 | 4/2008 | Dimitrova |
| 7,362,950 | B2 | 4/2008 | Jun et al. |
| 9,183,881 | B2 * | 11/2015 | Issa ................. H04N 5/783 |
| 2002/0038383 | A1 | 3/2002 | Ullman et al. |
| 2002/0069218 | A1 | 6/2002 | Sull et al. |
| 2002/0194608 | A1 | 12/2002 | Goldhor |
| 2003/0146940 | A1 | 8/2003 | Ellis et al. |
| 2004/0098754 | A1 | 5/2004 | Vella et al. |
| 2004/0205087 | A1 | 10/2004 | Dorsey et al. |
| 2004/0255336 | A1 * | 12/2004 | Logan ................. H04H 20/28 725/135 |
| 2005/0125821 | A1 | 6/2005 | Li et al. |
| 2005/0283475 | A1 | 12/2005 | Beranek et al. |
| 2006/0004704 | A1 | 1/2006 | Gross |
| 2006/0161952 | A1 | 7/2006 | Herz et al. |
| 2006/0174293 | A1 | 8/2006 | Ducheneaut et al. |
| 2007/0033531 | A1 | 2/2007 | Marsh |
| 2007/0094687 | A1 | 4/2007 | Russell |
| 2007/0124795 | A1 | 5/2007 | McKissick et al. |
| 2007/0143493 | A1 | 6/2007 | Mullig et al. |
| 2007/0204310 | A1 | 8/2007 | Hua et al. |
| 2007/0219949 | A1 | 9/2007 | Mekikian |
| 2007/0220552 | A1 | 9/2007 | Juster et al. |
| 2007/0261095 | A1 | 11/2007 | Petrisor et al. |
| 2007/0299870 | A1 | 12/2007 | Finch |
| 2008/0065693 | A1 | 3/2008 | Malik |
| 2008/0086456 | A1 | 4/2008 | Rasanen et al. |
| 2008/0086688 | A1 | 4/2008 | Chandratillake et al. |
| 2008/0092168 | A1 * | 4/2008 | Logan ............... G06F 17/30265 725/44 |
| 2008/0109750 | A1 | 5/2008 | Lin-Hendel |
| 2008/0124052 | A1 | 5/2008 | Sardera |
| 2008/0127268 | A1 | 5/2008 | Bergeron et al. |
| 2008/0140523 | A1 | 6/2008 | Mahoney et al. |
| 2008/0155461 | A1 | 6/2008 | Ozaki |
| 2008/0281689 | A1 | 11/2008 | Blinnikka et al. |
| 2009/0119166 | A1 | 5/2009 | Taylor et al. |
| 2009/0180753 | A1 * | 7/2009 | Kitazato ............. H04N 9/8042 386/248 |
| 2010/0199295 | A1 | 8/2010 | Katpelly et al. |

OTHER PUBLICATIONS

Tsinaraki, C. et al., "A Video Metadata Model Supporting Personalization & Recommendation in Video-based Services," Proc. of MDDE Workshop (in conjunction with RETIS), Lyon, France, Jul. 2001, pp. 104-109, found at <http://citeseer.ist.psu.edu/viewdoc/summary?doi=10.1.1.104.3610>, 6 pages.

Pfeiffer, Silvia, "Architecture of a Video Web—Experience with Annodex," at <http://www.w3.org/2007/08/video/positions/annocex.pdf>, dated Nov. 21, 2007, Position Statement W3C Video Workshop, Dec. 12-13, 2007, San Jose, California and Brussels, Belgium, 5 pages.

"Asterpix Interactive Video—Frequently Asked Questions," at <http://www.video.asterpix.com/help>, found on the Internet Archive, dated May 13, 2009, appears to date back as early as Oct. 2007, printed May 13, 2011, 8 pages.

lskrocki, "How to disable YouTube's new related videos feature," Jun. 7, 2007, at <http://blogs.oracle.com/Iskrocki/entry/how_to_disable_youtube_s>, printed Dec. 12, 2011, 6 pages.

"Hypermedia," at <http://en.wikipedia.org/wiki/Hypermedia>, page last modified May 9, 2011, printed May 13, 2011, 2 pages.

"Hypervideo," at <http://en.wikipedia.org/wiki/Hypervideo>, page last modified Apr. 13, 2011, printed May 13, 2011, 5 pages.

Weng, Chung-Yi et al., "Movie Analysis Based on Role's Social Network," In Proceedings of IEEE International Conference on Multimedia and Expo, Jul. 2-5, 2007, Beijing, China, pp. 1403â€"1406, found at <http://www.cmlab.csie.ntu.edu.tw/new_cml_website/media/publications/Weng-2007-MAB.pdf>, 4 pages.

Worring, Marcel and Snoek, Cees, "SAMT 2006—Semantic Indexing and Retrieval of Video," SAMT 2006 Conference in Athens, Greece, Dec. 6-8, 2006, 172 pages.

Bolle, R. M. et al, "Video query: Research directions," IBM Journal of Research and Development, vol. 42, Issue: 2, Digital Object Identifier: 10.1147/rd.422.0233, Publication Date: Mar. 1998, pp. 233-252, copyright 1998, IBM, 20 pages.

"What is Tribler?", found at <http://www.tribler.org/trac/wiki/whatIsTribler>, dated stated as "Last modified 3 years ago," with most history noted as being modified 3 or more years ago, visited and printed on Dec. 14, 2011, 2 pages.

Miller, Michael, "YouTube 4 You," Que, Apr. 26, 2007, pp. 10-15, 39-48, 52-56, 69-71, 128-129, and 153-155, 30 pages.

* cited by examiner

SYSTEM AND METHOD FOR SEMANTIC TRICK PLAY

CROSS-REFERENCE TO RELATED APPLICATIONS

This application is a continuation of U.S. patent application Ser. No. 12/457,428, which was filed Jun. 10, 2009, which claims the benefit of provisional patent application Ser. No. 61/149,220, filed Feb. 2, 2009, the disclosures of which are hereby incorporated by reference in their entireties.

BACKGROUND

The present disclosure relates generally to a media system and, more particularly, to a media system for, and method of, semantic trick play.

In general, online video on demand (VoD) systems are growing and becoming more accessible (Netflix®, Amazon, Apple TV®). As content libraries grow, a semantic system would be useful and desirable for video systems in order to attract and maintain viewership. A semantic catalogue can help a viewer bridge the gap on plot knowledge and find relevant content across content libraries.

SUMMARY

According to one aspect, the present invention provides a method of semantic trick play in a media player, including: receiving a semantic trick play command during playback of a current content of a media item; detecting metadata with respect to a current playback position of the media item; determining at least one further playback position in the current content of the media item or a related content in another media item, the further playback position being semantically related to the metadata of the current playback position; and moving playback to the at least one further playback position, so that a media content of the at least one further playback position is then played back by the media player.

In the method, the media item may include a video item.

The current playback position may include a first scene in a video episode, and the at least one further playback position may comprise a second scene within the video episode, which is semantically and causally linked to the first scene.

Alternatively, the current playback position may include a first scene in a first video episode, and the at least one further playback position may comprise a second scene within a second video episode, which is semantically and causally linked to the first scene in the first video episode.

According to another aspect of the present invention, a media system for semantic trick play in a video player is provided, including: means for receiving a semantic trick play command from a user while the user is viewing a current content of a video item; means for detecting metadata with respect to a current playback position of the video item; means for determining at least one further playback position in the current content of the video item or a related content in another video item, the further playback position being semantically related to the metadata of the current playback position; and means for moving playback to the at least one further playback position, so that the user views a video content of the at least one further playback position.

The present invention also contemplates a computer readable medium including software for instructing a media system to: receive a semantic trick play command from a user while the user is experiencing a current content of a media item; detect metadata with respect to a current playback position of the media item; determine at least one further playback position in the current content of the media item or a related content in another media item, the further playback position being semantically related to the metadata of the current playback position; and move playback to the at least one further playback position, so that the user experiences a media content of the at least one further playback position.

The present invention also provides a media system for semantic trick play, including: a media player which detects information regarding a currently viewed first scene of a video content based on a current playback location; a content semantic model which receives the information regarding the currently viewed first video scene and returns to the media player a reference to a second scene within the video content and which is semantically and causally linked to the currently viewed first scene; a content server which receives a request from the media player and then returns to the media player the second scene which is semantically and causally linked to the first scene; and a display device which displays the video content; wherein the media player plays back the second scene on the display device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Note that at times the system of the present invention is described as performing a certain function. However, one of ordinary skill in the art would know that the program is what is performing the function rather than the entity of the system itself.

Although aspects of one implementation of the present invention are depicted as being stored in memory, one skilled in the art will appreciate that all or part of systems and methods consistent with the present invention may be stored on or read from other computer-readable media, such as secondary storage devices, like hard disks, floppy disks, and CD-ROM, a carrier wave received from a network such as the Internet, or other forms of ROM or RAM either currently known or later developed. Further, although specific components of the system have been described, one skilled in the art will appreciate that a system suitable for use with the methods and systems consistent with the present invention may contain additional or different components.

Figure 1:
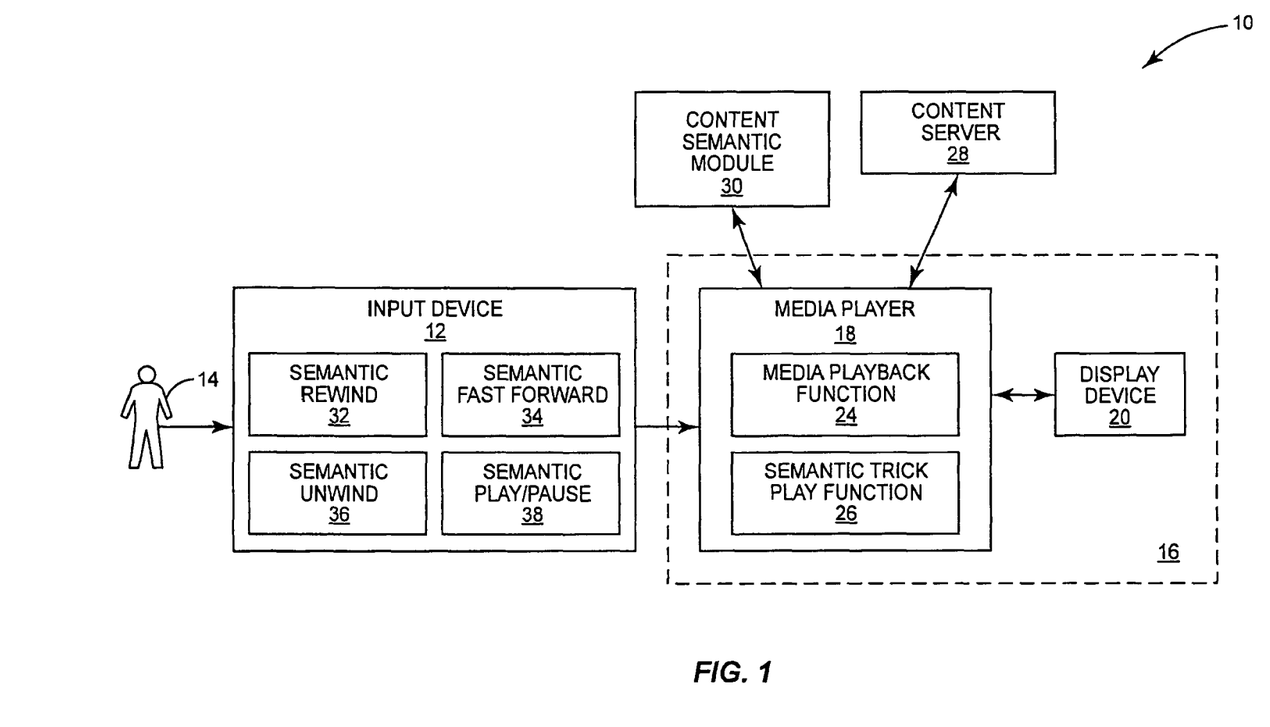
FIG. 1 illustrates a media system according to an exemplary embodiment of the present invention.

FIG. 1 illustrates a media system according to an exemplary embodiment of the present invention. In general, the media system for semantic trick play 10 includes an input device 12, such as but not limited to a keyboard, keypad, or remote control for operation by an associated user 14, and a media playback system 16. In this exemplary embodiment, the media playback system 16 includes a media player 18 and a display device 20.

The media player 18 may be, for example, a personal computer, a set-top box (STB) for playing digital television content received from a television content provider, a Digital Video Recorder (DVR) for playing previously recorded video content such as previously recorded television content received from a television content provider, an Apple TV® device for playing downloaded content that has been purchased or rented from a remote media distribution service such as the Apple® iTunes® store, a Digital Versatile Disc (DVD) player, or the like. The media player 18 may be connected to the display device 20 via any desired audio/video connection such as, for example, a High Definition Multimedia Interface (HDMI) connection, a Digital Video Interface (DVI) connection, a coaxial cable connection, or the like. The display device 20 may be, for example, a computer display screen, a television (TV), or the like. In an alternative embodiment, the display device 20 may be incorporated into the media player 18.

The media player 18 includes a media playback function 24 and a semantic trick play function 26, each of which may be implemented in software, hardware, or a combination thereof. The media playback function 24 generally operates to provide playback of media items obtained from a content source or server 28. In the exemplary embodiment, the media items are video items. As such, the media playback function 24 provides playback of the video items and presentation of the video items to the user 14 via the display device 20. The content server 28 varies depending on the particular implementation of the media player 18. For example, if the media player 18 is an STB, then the content server 28 may be a television content distribution network such as a Cable Television (CATV) network. As another example, if the media player 18 is a DVD player, then the content server 28 is a DVD. As a further example, if the media player 18 is a device such as an Apple TV® device, then the content server 28 may be a remote media distribution service such as the Apple® iTunes® store, where the media player 18 has access to the remote media distribution service via a network such as, for example, the Internet.

The following is a more detailed description of the semantic trick play consistent with the present invention.

The semantic relationships between plot elements across one piece of content or various pieces of content may be established using various techniques, including, but not limited to, one of the following exemplary techniques: user community networks (for example, The Internet Movie Database (IMDb)), by a content provider, or semantic analysis/indexing and retrieval of video/storyline detection.

There are currently many active user community networks around popular video content. Such a user community may create the relationships using: a wiki-model where multiple contributors refine semantic relationships in the process of creating annotations and other useful content related to the video content. Alternatively, a DVR interface may be used where the semantic relationships can be created by individual users and aggregated by a service using the DVR, while watching the content.

When provided by the content provider, the MPEG-7 standard allows for annotations to be bundled along with the original piece of content. The semantic relationships or references to semantic relationships can be encoded in MPEG-7 by the content provider.

With respect to semantic analysis, indexing and retrieval of video, and storyline detection, these techniques leverage various techniques in, for example but not limited to, video analysis of visual effects, speech and audio effects, object and facial recognition, natural language processing and semantic analysis using speech recognition, ontologies, machine learning, information indexing and retrieval and semantic or ontological querying.

Moreover, performing metadata analysis on a particular scene of a video contemplates metadata that may include, but is not limited to, at least one of: descriptions of a video scene, actual and/or fictional names of characters in a video scene, data structures establishing semantic links between two or more video scenes, or indexes that allow semantic linking and retrieval.

Moreover, for each video scene or segment, the metadata information identifying and describing the segment may include information describing the content of the segment of the media item. For example, the information may describe the segment as containing an action scene, a romantic scene, or the like. As another example, if the media item is one of the Star Wars movies, the information may describe the content of the segment more specifically as containing a Princess Leia scene, a Darth Vader scene, a droid scene, a space-fighting scene, or the like. As another example, the information describing the segment may include a list of actors or actresses appearing in the segment and/or a description of activities that take place in the segment. The information describing the content of the segments of the media item may be information provided by a producer or creator of the media item, information such as annotations provided by one or more users that have previously viewed the media item, or the like, or any combination thereof.

Also consistent with the present invention, the metadata may be, for example, tags, annotations, a script or lyrics for the media item, closed-captioning information, sub-titles, or the like. Moreover, the semantic trick play function 26 may also utilize a combination of audio and video frame analysis techniques. For example, to detect violent content, in addition to frame analysis techniques to detect, for example, smoke or blood pixels, the system may also utilize audio analysis techniques, for example, to detect gunshot sounds.

Figure 3:
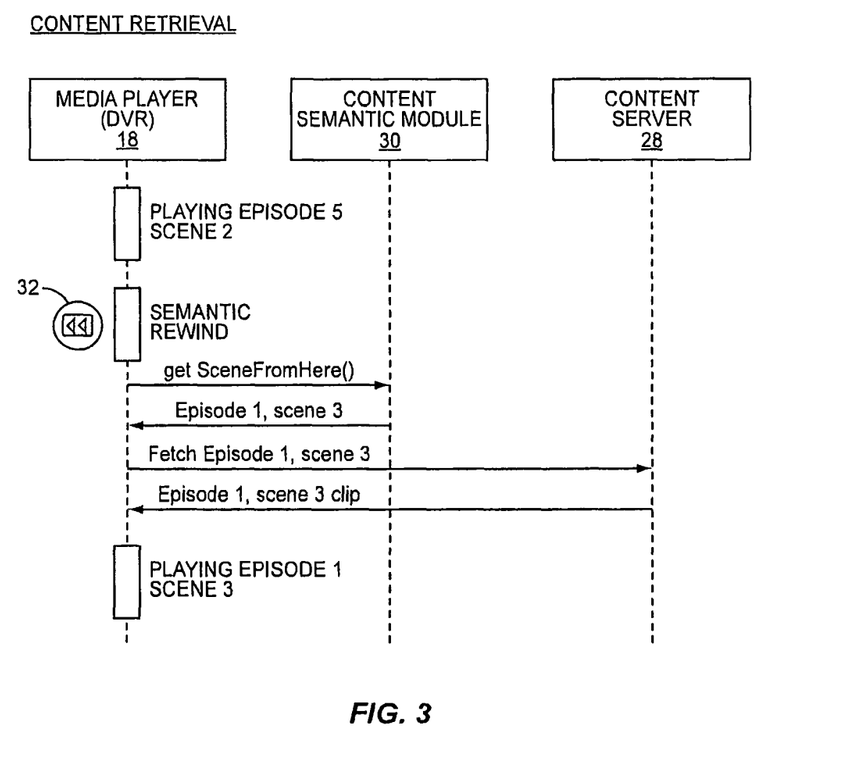
FIG. 3 depicts an illustrative embodiment of the media system of FIG. 1 operating in a content retrieval mode.

For utilizing semantic trick play across episodes, a content library is provided to be available to the DVR (see, for example, content server 28 in FIGS. 1 and 3). The content library can be a local library (such as iTunes®/Apple TV®) or at some remote content library source (such as cable VoD or Netflix®).

An explanation of some of the terms and functions will now be provided in the context of the present invention. Content semantic relationships may span across episodes, movies or genres, various multimedia content types, and result in a semantic content tree, which is navigable by the media system for semantic trick play 10 making requests for semantic trick play functions. While the present invention refers to a semantic content tree, other semantic content relationships are contemplated and may also resemble graph structures other than a tree. Thus, in semantic content trees, nodes have a single parent node, which implies that a single event in a plot leads to a single consequence, or conversely a single event may have only a single cause. If the plot is linear (which is the typical case), the semantic structure would resemble a tree, but in case of non-linear or complex plots, the relationship structure can adopt a correspondingly complex shape. For instance, a single plot event may cause multiple, mutually-unrelated events down the line, in which case, the relationship structure would look like, for example, a web of interleaved trees rather than a single tree. Another case is where a single content item has multiple plot-lines (e.g., a soap, etc.).

These semantic relationships are stored in a remote server, such as the content server 28, or downloaded to the local playback device, such as the media player 18.

Forward and backward references in the semantic content tree generally represent moving back and forth in plot lines, episodes or story lines.

The term "trick play" generally refers to using the transport or viewing controls such as pause, instant replay, rewind, etc., of the media player 18 (for example, a DVR system). Embodiments commensurate with the present invention relate to a semantic based trick play system, such that an additional set of trick play controls is also available which is based on semantics instead of time.

Semantic trick play functions are implemented, for example, in software and have the following functionality:

Semantic Rewind—When a user selects semantic rewind: (1) the current video pauses; (2) the media player 18 (e.g., DVR or playback unit) fetches the semantic tree for this video segment or scene; (3) a selection is made from the semantic tree; (4) the DVR looks back semantically to the referred video segment; (5) the DVR fetches the video segment, and the current segment location is stored for later reference; (6) the DVR starts playing the fetched video segment; and (7) at the conclusion of playing, the user may either hit semantic rewind again, and go back to step (1), or do nothing, and the system continues playback on the previous video.

Semantic Fast Forward—This function is similar to Semantic Rewind, except the system moves forward in the semantic tree.

Semantic Play/Pause—This function executes play and pause on the current video clip.

Semantic Unwind (or Resume)—This function serves to unwind all trick play functions and return to the original video clip and the position in which the semantic trick play was initially invoked.

The semantic trick play functionality will be discussed in more detail later on in connection with FIGS. 1, 3 and 4.

Figure 2A:
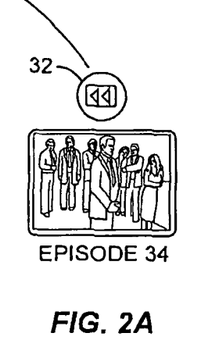
FIGS. 2A through 2D depict a broad overview of a semantic rewind operating in the media system of FIG. 1 according to an illustrative embodiment.
Figure 2B:
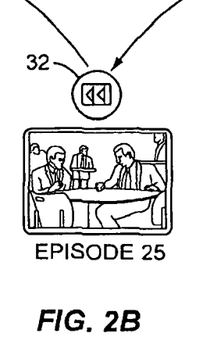
Figure 2C:
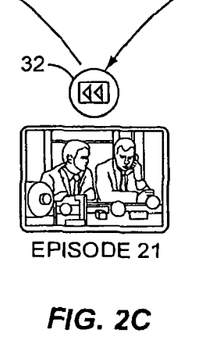
Figure 2D:
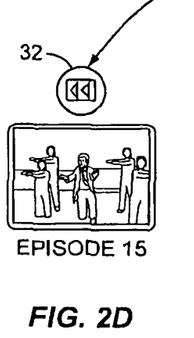

FIGS. 2A through 2O show a broad overview of a semantic rewind consistent with an exemplary embodiment of the present invention. On the far right in FIG. 2A, a user 14 is viewing an episode of "The Office" (Episode 34). The user has missed a few episodes and is not aware of plot subtleties. In one such scene during Episode 34, the user 14 does not understand a plot element and hits "semantic rewind", for example, a button 32 on the input device 12. As shown in FIG. 2B, the user 14 is taken back to a previous scene in Episode 25 which explains the reference. As further shown in FIGS. 2C and 2O, the user 14 continues to hit the semantic rewind button 32 and the system continues to take him back to the various connected plot elements in Episodes 21 and 15.

Similarly, the user 14 may hit a "semantic fast forward", for example, a button 34 on the input device 12 (see FIG. 1), and the system 1O would take him forward to follow the current plot element. While the broad overview above shows an example regarding various episodes, the semantic trick play consistent with the present invention can be across one piece of content, as well as various episodes.

Figure 4:
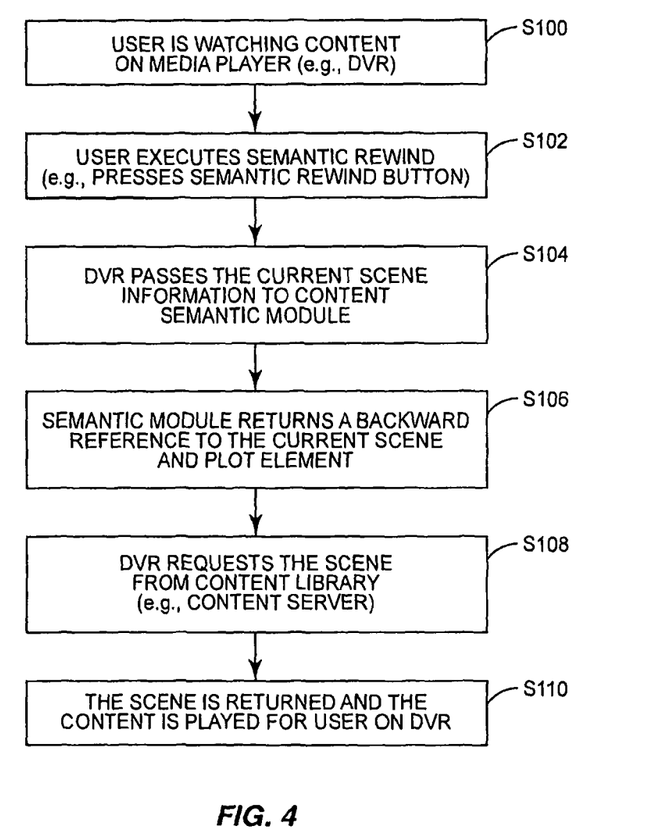
FIG. 4 depicts an illustrative embodiment of a method operating in the media system of FIGS. 1 and 3.

FIG. 3 depicts an illustrative embodiment of the media system of FIG. 1 operating in a content retrieval mode, whereas FIG. 4 depicts an illustrative embodiment of a method operating in the media system of FIGS. 1 and 3.

With reference to FIGS. 1, 3 and 4, in step S100, a user 14 is watching video content (e.g., playing Episode 5, scene 2) on the media player 18, such as a DVR. The user 14 executes a semantic rewind by pressing the semantic rewind button 32 on the input device 12 (step S102).

In step S104, the DVR passes the current scene information to the content semantic module 30. While the content semantic module 30 is shown as a separate unit in FIGS. 1 and 3, the content semantic module 30 can be hosted locally on the media player (e.g., DVR) 18, or on a remote system.

The content semantic module 30 returns a backward reference to the current scene and plot element (step S106). In FIG. 3, as an example, Episode 1, scene 3, is returned by the semantic module 30.

In step S108, the DVR 18 requests the scene from the content library, which may be content server 28 (i.e., a request is made to fetch Episode 1, scene 3, from the content server 28).

Finally, in step S110, the scene is returned and the content is played for the user 14 on the DVR 18 by the semantic trick play function 26 (i.e., the Episode 1, scene 3 clip is returned and then played for the user 14). The user 14 can play or pause the returned scene by hitting the semantic play/pause button 38 on the input device 12. Accordingly, the user 14 is able to play back the scene from an earlier episode which is related in some fashion to the episode and scene he was originally watching. Similarly, for executing a semantic fast forward, the media player 18 passes the current scene information to the content semantic module 30, and the semantic module 30 returns to the media player 18 a forward reference to the current scene. The media player 18 requests the returned reference from the content server 28. The scene is returned and the content is played on the media player 18.

Example 1

Semantic Rewind Across Multiple Videos

Richard is a spotty watcher of "The Office" from NBC. During one particular scene, he hears Michael Scott use the words "Dinka Flicka". He does not understand the reference, because he has missed so many episodes, so he hits the "Semantic Rewind" button 32. His DVR fetches a scene from an episode from last season where Darryl, from the warehouse, teaches Michael fake urban slang. Richard understands and is happy.

Example 2

Semantic Rewind within Same Video

Cathy is watching an old MacGyver episode on ABC.com. She gets confused at one point as the plot does not make sense and asks "How the heck??" and presses the "Semantic Rewind" button 32 on input device 12. The media player 18 performs metadata analysis on the current scene and finds the metadata "ingenious use, do-not-try-this-at-home, stapler, rubber band, grappling hook". The player searches the indexed metadata of previous scenes and finds one with the metadata "surreptitious, hide, rubber band, stapler, plot device", and identifies this scene as a potential solution.

Alternatively, prior analysis has been performed on this video, either by machine or human users, and a semantic link graph is embedded in the metadata layer (MPEG 7) which links these two scenes. The media player 18 simply traverses this graph for a semantic rewind. The media player 18 rewinds to that scene.

Cathy watches the scene closely this time. She notices him slip a rubber band and a stapler in his coat pocket, and finally understands how he was able to build a grappling hook launcher to pull himself out of the mine shaft.

She presses "Semantic Unwind" button 36 and jumps back to her previous position. She then gets a call that she has to take, and cannot watch the full episode, so she double taps the "Semantic Fast Forward" button 34. This takes her to the climactic scene where the entire plot is resolved. She stops watching the video and takes the call A further description of how semantic relevance is established will not be described.

When a user invokes a semantic trick play function, the system 10 has to determine what is semantically relevant at that point in playback. There may be several interesting semantic items, which may be identified using various techniques already discussed. Each of these semantic items will take different paths through the semantic content tree. The system 10 thus determines which of these semantic paths to take using any combination of the following techniques:

1) As instructed by the content provider/producer, the content producer instructs the system as to what is semantically relevant during which video segments/scenes/clips.
2) By user community: either implicitly or explicitly, the user community votes on what is most relevant. "Implicit" refers to, for example, a semantic path that users have taken in the past or a historical selection. It can also refer to a historical path related to the current video content or the current location within the video. "Explicit" refers to a situation where a user obtains multiple options and then the user makes the choice and selects his choice by, for example, pressing a button.
3) By querying the user: upon involving semantic trick play, the system displays to the user the semantically relevant points in the current video segment or time, and the user selects which is most relevant to him.
4) User history and profile: the system makes a calculated judgment about what is most relevant to the user, using history of previous selections or the user profile.

In the exemplary embodiment, establishing semantic relevance may include Causal Graphs or Causal Networks. A Causal Graph, as used herein, describes the causal relationship between two states or events, e.g., event E1 "causes" or "enables" or "leads to" event E2, or state S1 is "changed by" event E1 to state S2.

For instance, at a high level, E1 may describe scene S1, where "MacGyver steals a rubber band and a stapler", and E2 may describe S2, where "MacGyver builds a grappling hook out of a rubber band and a stapler", and hence there is a causal "enables" relationship between E1 and E2, and by extension, scenes S1 and S2. A Semantic Rewind operation on a scene S2 described by E2 would travel this causal relationship backwards to accurately identify scene S1 described by E1 that enables it.

Thus, in the present invention, the semantic trick play operation should not take the user to a scene with similar semantic/ontological nodes but absolutely no causal relationship. For instance, a rewind on scene S1 where MacGyver steals a stapler and a rubber band, tagged with semantic nodes ["MacGyver", "stapler", "rubber band"], should not take the viewer to an unrelated scene S3 where MacGyver uses a stapler to staple a bunch of forms and bundles them up using a rubber band, which also happens to be tagged with semantic nodes ["MacGyver", "stapler", "rubber band"]. Instead, and unlike previous solutions that do not consider causality, in the present invention, the Semantic Rewind on scene S1 takes the user to the related scene S2

Constructing such data structures through automated video analysis may be accomplished using techniques in the fields of artificial intelligence (AI), Machine Learning and Natural Language Processing, and are thus contemplated by this invention. For the purposes of this invention, however, such Causal Networks also may be created manually by human operators or user created links.

In addition, techniques employing probabilistic approaches and heuristics may also be applied.

For instance, a scene S1 tagged (either automatically or manually) with ["MacGyver", "steals", "stapler", "rubber band"] would have a high correlation with a scene S2 tagged with ["MacGyver", "uses", "stapler", "rubber band" "builds", "grappling hook"] simply because they share a large number of tags, and hence there is a high chance they are causally related. Furthermore, the fact that scene S1 occurs before S2 (comparing temporal locations) indicates that S1 probably causes S2, i.e., the causal relationship can be described as:

S1 - - - - [leads to] - - - - >S2.

Such simple probabilistic models may lead to a large number of relevant causal relationships, which can be further filtered and/or enhanced using heuristics. For example, S1 and S2 occur in the same episode, which gives the causal relationship higher probability of being accurate as opposed to, for example, a link between S1 and S3, or S2 and S3, where S3 occurs in a different episode. As another example, the tag "MacGyver" shows up in 90% of all scenes, which implies that it is a primary focus of this video. Hence when comparing tags and identifying relevant videos, that tag is given lower weight, that is, if two scenes only have that one tag "MacGyver" in common, they are not deemed to be especially relevant to each other.

Note that the tags do not have to explicitly name the objects or actions they refer to, but they may just identify common objects using video object recognition, i.e., ["MacGyver", "rubber band", "stapler"] may simply be identified as objects ["P1", "02", "03"] and those same objects showing up in both scenes would lead to both scenes having the same tags. Video object recognition and object identification per se are well known in computer vision art.

The present invention has substantial opportunity for variation without departing from the spirit or scope of the present invention. For example, while the embodiments discussed herein are directed to personal or in-home playback, the present invention is not limited thereto. Further, while the examples refer to video segments or scenes, the present invention is not limited thereto and other forms of media content are contemplated herein.

Those skilled in the art will recognize improvements and modifications to the preferred embodiments of the present invention. All such improvements and modifications are considered within the scope of the concepts disclosed herein and the claims that follow.

What is claimed is:
1. A media player comprising:
at least one communication interface;

at least one processor in communication with the communication interface, the media player adapted to:
- receive a semantic trick play command during playback of a current content of a media item;
- detect metadata with respect to a current playback position of the media item;
- determine at least one further playback position having a content descriptive attribute in the current content of the media item or a related content in another media item, the further playback position content descriptive attribute being semantically related to the metadata of the current playback position; and
- move playback to the at least one further playback position, so that a media content of the at least one further playback position is then played back by the media player.

2. The media player of claim 1, wherein to determine the at least one further playback position, the media player is adapted to determine the at least one further playback position based on at least one of: a user command, semantic relevance, a user context, a user profile, or accessibility of the at least one further playback position.

3. The media player of claim 1, wherein the media item comprises a video item.

4. The media player of claim 3, wherein the current playback position comprises a first scene in a first video episode, and the at least one further playback position comprises a second scene within a second video episode, which is semantically and causally linked to the first scene in the first video episode.

5. The media player of claim 4, wherein to move playback to the at least one further playback position the media player is adapted to semantically rewind to the second scene.

6. The media player of claim 5, wherein to semantically rewind to the second scene, the media player is adapted to initiate the semantically rewind in response to a semantic rewind command from an input device.

7. The media player of claim 4, wherein to move playback to the at least one further playback position, the media player is adapted to semantically fast forward to the second scene.

8. The media player of claim 7, wherein to semantically fast forward to the second scene, the media player is adapted to initiate the semantically fast forward in response to a semantic fast forward command from an input device.

9. The media player of claim 3, wherein the current playback position comprises a first scene in a video episode, and the at least one further playback position comprises a second scene within the video episode, which is semantically and causally linked to the first scene.

10. The media player of claim 9, wherein the metadata comprises at least one of: descriptions of a video scene, actual and/or fictional names of characters in a video scene, data structures establishing semantic links between two or more video scenes, or indexes that allow semantic linking and retrieval.

11. The media player of claim 9, wherein to move playback to the at least one further playback position, the media player is adapted to semantically rewind to the second scene.

12. The media player of claim 11, wherein to semantically rewind to the second scene, the media player is adapted to initiate the semantic rewind in response to a semantic rewind command from an input device.

13. The media player of claim 9, wherein to move playback to the at least one further playback position, the media player is adapted to semantically fast forward to the second scene.

14. The media player of claim 13, wherein to semantically fast forward, the media player is adapted to initiate the semantically fast forward in response to a semantic fast forward command from an input device.

15. An apparatus comprising:
- a memory comprising instructions for execution by one or more processors; and one or more processors coupled to the memory, the one or more processors being operable when executing the instructions to:
  - receive information from a device regarding a currently viewed first scene;
  - determine a second scene having a content descriptive attribute within the video content, where the content descriptive attribute is semantically and causally related to the information of the currently viewed first scene; and
  - return to the device a reference to the second scene having a content descriptive attribute within the video content and where the content descriptive attribute is semantically and causally related to the information of the currently viewed first scene.

16. The apparatus of claim 15 wherein the semantic and causal relationship is established by at least one of user community networks, a content provider, and semantic analysis/indexing and retrieval of video/storyline detection.

17. The apparatus of claim 15 wherein the first scene and the second scene are scenes from one video.

18. The apparatus of claim 15 wherein the first scene and the second scene are from different videos.

* * * * *